US012769294B2

(12) United States Patent
Lee et al.

(10) Patent No.: US 12,769,294 B2
(45) Date of Patent: Oct. 20, 2026

(54) AUTONOMOUS MOBILE ROBOT AND SEMICONDUCTOR MANUFACTURING EQUIPMENT INCLUDING THE SAME

(71) Applicant: SEMES CO., LTD., Cheonan-si (KR)

(72) Inventors: Hoyoung Lee, Yongin-si (KR); Seungchan Lee, Hwaseong-si (KR); Sang Ok Park, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 430 days.

(21) Appl. No.: 18/382,523

(22) Filed: Oct. 22, 2023

(65) Prior Publication Data

US 2024/0152131 A1 May 9, 2024

(30) Foreign Application Priority Data

Nov. 7, 2022 (KR) ........................ 10-2022-0147338

(51) Int. Cl.
*G05B 19/418* (2006.01)

(52) U.S. Cl.
CPC .................. *G05B 19/41895* (2013.01); *G05B 2219/40298* (2013.01); *G05B 2219/45031* (2013.01)

(58) Field of Classification Search
CPC .... G05B 19/41895; G05B 2219/40298; G05B 2219/45031; H01L 21/67724; H01L 21/67706; H01L 21/67721; B25J 5/007; B25J 9/1664; B25J 19/005; B25J 9/0009; B25J 9/162; B25J 9/1689; B25J 13/006; B25J 13/089
See application file for complete search history.

(56) References Cited

U.S. PATENT DOCUMENTS

2013/0190915 A1* 7/2013 Choo ................. G05B 19/4189 700/113
2022/0250792 A1 8/2022 Bae et al.

FOREIGN PATENT DOCUMENTS

KR 10-2016-0129515 11/2016
KR 20160129515 A * 11/2016 ........... G05D 1/0214
(Continued)

OTHER PUBLICATIONS

Office Action from the Korean Intellectual Property Office dated Apr. 17, 2024.

*Primary Examiner* — Yuhui R Pan

(57) ABSTRACT

Provided is an autonomous mobile robot (AMR) and semiconductor manufacturing equipment including the same, the AMR including an autonomous mobile module capable of autonomously moving along a certain autonomous motion path between a plurality of semiconductor manufacturing apparatuses disposed in semiconductor manufacturing equipment for manufacturing semiconductor devices, to supply materials to or perform maintenance on any one of the plurality of semiconductor manufacturing apparatuses in the semiconductor manufacturing equipment, and a loading module provided as a transferable structure including a manipulator for supplying materials to or performing maintenance on any one of the plurality of semiconductor manufacturing apparatuses, and docked to and transferred by the autonomous mobile module, wherein, in the autonomous mobile module, a male coupler rotatably protruding from a docking surface of the autonomous mobile module so as to be inserted into a female coupler of the loading module is flexibly supported by a first elastic member.

20 Claims, 14 Drawing Sheets

(56) References Cited

FOREIGN PATENT DOCUMENTS

| | | | | | |
|---|---|---|---|---|---|
| KR | 10-1884232 | | | 8/2018 | |
| KR | 10-2020-0106769 | | | 9/2020 | |
| KR | 20200106769 | A | * | 9/2020 | ......... G01R 31/2887 |
| KR | 10-2020-0126774 | | | 11/2020 | |
| KR | 10-2021-0014032 | | | 2/2021 | |
| KR | 10-2021-0122010 | | | 10/2021 | |
| KR | 10-2022-0115249 | | | 8/2022 | |

* cited by examiner

AUTONOMOUS MOBILE ROBOT AND SEMICONDUCTOR MANUFACTURING EQUIPMENT INCLUDING THE SAME

CROSS-REFERENCE TO RELATED PATENT APPLICATION

This application claims the benefit of Korean Patent Application No. 10-2022-0147338, filed on Nov. 7, 2022, in the Korean Intellectual Property Office, the disclosure of which is incorporated herein in its entirety by reference.

BACKGROUND OF THE INVENTION

1. Field of the Invention

The present invention relates to an autonomous mobile robot (AMR) and semiconductor manufacturing equipment including the same and, more particularly, to an AMR capable of autonomously moving along a certain autonomous motion path between a plurality of semiconductor manufacturing apparatuses in semiconductor manufacturing equipment, and semiconductor manufacturing equipment including the same.

2. Description of the Related Art

Currently, data processing devices are being rapidly developed to have various types of functions and higher data processing speeds. The data processing devices include a display device to display processed data. Although cathode ray tube (CRT) monitors have been commonly used as the display device until now, the use of light and space-saving flat panel displays is rapidly increasing due to the rapid development of semiconductor technology these days.

The flat panel displays include various types such as thin film transistor-liquid crystal displays (TFT-LCDs) and organic electroluminescence (EL) displays. A manufacturing process of these flat panel displays unavoidably requires a series of processes based on photolithography for patterning a thin film deposited on a substrate, i.e., unit processes such as coating, exposure, development, and cleaning.

Semiconductor manufacturing equipment including a plurality of semiconductor manufacturing apparatuses for performing the various unit processes may include a transfer device for supplying materials to the semiconductor manufacturing apparatuses for performing the manufacturing processes. For example, the semiconductor manufacturing apparatuses may include probe stations for electrically testing semiconductor devices formed on a wafer, and the transfer device may include an autonomous mobile robot (AMR) for supplying materials such as wafers and probe cards to the probe stations.

However, in the existing AMR, an autonomous mobile module capable of autonomously moving along a certain autonomous motion path between the plurality of semiconductor manufacturing apparatuses in the semiconductor manufacturing equipment is not compatible with various loading modules to be docked to and transferred by the autonomous mobile module, and thus a plurality of autonomous mobile modules are required to be compatible with different types of loading modules.

In addition, when a stop position error of the autonomous mobile module occurs in a docking process between the autonomous mobile module and the loading module, an appropriate connection may not be established between a male coupler of the autonomous mobile module and a female coupler of the loading module, which are provided for power supply and communication between the autonomous mobile module and the loading module, and thus the docking between the autonomous mobile module and the loading module may fail.

SUMMARY OF THE INVENTION

The present invention provides an autonomous mobile robot (AMR) including one autonomous mobile module compatible with a plurality of loading modules to selectively use the plurality of loading modules depending on a purpose of use, and including a coupler flexibly supported by an elastic member, to enable appropriate docking between the autonomous mobile module and the loading module even when a position error occurs, and semiconductor manufacturing equipment including the AMR. However, the above description is an example, and the scope of the present invention is not limited thereto.

According to an aspect of the present invention, there is provided an autonomous mobile robot (AMR) including an autonomous mobile module capable of autonomously moving along a certain autonomous motion path between a plurality of semiconductor manufacturing apparatuses disposed in semiconductor manufacturing equipment for manufacturing semiconductor devices, to supply materials to or perform maintenance on any one of the plurality of semiconductor manufacturing apparatuses in the semiconductor manufacturing equipment, and a loading module provided as a transferable structure including a manipulator for supplying materials to or performing maintenance on any one of the plurality of semiconductor manufacturing apparatuses, and docked to and transferred by the autonomous mobile module, wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked.

The autonomous mobile module may include a mobile body provided with a plurality of wheel units to autonomously move between the plurality of semiconductor manufacturing apparatuses in the semiconductor manufacturing equipment, a docking plate provided in a plate shape to provide a flat docking surface on an upper surface thereof, and mounted on an upper surface of the mobile body, and the male coupler rotatably mounted on the docking surface of the docking plate so as to be inserted into the female coupler of the loading module.

The male coupler may include a coupler body provided in a shape corresponding to at least a portion of a shape of the female coupler of the loading module, and a rotating cylinder provided in a cylindrical shape overall and rotatably mounted on the docking plate to support the coupler body.

The rotating cylinder may be provided as the first elastic member to flexibly support the coupler body.

The first elastic member may include a first coil spring produced by spirally coiling a wire rod with a circular horizontal cross-section in a cylindrical shape overall.

The rotating cylinder may be mounted on the docking plate to position a rotational axis thereof on the same line as a central axis of the docking plate.

The female coupler may include a coupler holder provided in a cylindrical shape, a docking indentation concavely formed from a lower surface of the coupler holder to have a circular horizontal cross-section, and a bump indentation concavely formed sideward or upward from the docking indentation in a certain shape.

The coupler body may include a docking protrusion provided in a circular plate shape or cylindrical shape having a smaller diameter than the coupler holder so as to be at least partially inserted into the docking indentation, and a bump protruding sideward or upward from the docking protrusion in a shape corresponding to at least a portion of a shape of the bump indentation so as to be at least partially inserted into the bump indentation.

The bump indentation of the female coupler may be formed to the same depth as the docking indentation, and concavely formed sideward from an outer circumferential surface of the docking indentation to have a rectangular horizontal cross-section, and the bump of the male coupler may protrude sideward from an outer circumferential surface of the cylinder-shaped docking protrusion in a cylindrical shape having a smaller diameter than the docking protrusion.

The bump indentation of the female coupler may be formed in an arc shape along an outer circumferential surface of the docking indentation, formed to a deeper depth than the docking indentation, and concavely formed upward from the docking indentation, and the bump of the male coupler may protrude from an upper surface of the circular plate-shaped docking protrusion in an arc shape along an outer circumferential surface of the docking protrusion.

At least an upper side portion of the bump may be provided as a slope inclined downward at a certain angle with respect to the upper surface of the docking protrusion.

One or more first contact terminals may be provided on a bottom surface of the docking indentation of the female coupler, and one or more second contact terminals to be in contact with the first contact terminals may be provided on an upper surface of the docking protrusion of the male coupler.

A plurality of first contact terminals may be radially and equiangularly disposed on a bottom surface of the docking indentation with respect to a center of the docking indentation, and a plurality of second contact terminals may be radially and equiangularly disposed on the upper surface of the docking protrusion with respect to a center of the docking protrusion.

The female coupler may be supported by a second elastic member so as to be flexibly supported by the loading module.

The second elastic member may include a second coil spring produced by spirally coiling a wire rod with a circular horizontal cross-section in a cylindrical shape overall.

The docking plate may be mounted on an upper surface of the mobile body so as to be lifted to a certain height.

The docking plate may include at least one guide bump protruding from the docking surface so as to be inserted into at least one guide indentation formed in a lower surface of the loading module when the loading module is docked.

According to another aspect of the present invention, there is provided semiconductor manufacturing equipment including a plurality of semiconductor manufacturing apparatuses for manufacturing semiconductor devices, an autonomous mobile robot (AMR) capable of autonomously moving along a certain autonomous motion path between the plurality of semiconductor manufacturing apparatuses to supply materials to or perform maintenance on any one of the plurality of semiconductor manufacturing apparatuses, and a motion controller capable of applying a control signal to the AMR in a wireless manner to control motion of the AMR, wherein the AMR includes an autonomous mobile module capable of autonomously moving along a certain path between the plurality of semiconductor manufacturing apparatuses, and a loading module provided as a transferable structure including a manipulator for supplying materials to or performing maintenance on any one of the plurality of semiconductor manufacturing apparatuses, and docked to and transferred by the autonomous mobile module, and wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked.

A semiconductor manufacturing apparatus on which maintenance work is performed may transmit, to the motion controller, a first signal indicating that the maintenance work has started and a second signal indicating that the maintenance work has ended and, when the first signal is received, the motion controller changes the autonomous motion path of the AMR so as not to overlap with a preset area around the semiconductor manufacturing apparatus on which the maintenance work is performed.

According to another aspect of the present invention, there is provided an autonomous mobile robot (AMR) including an autonomous mobile module capable of autonomously moving along a certain path between a plurality of semiconductor manufacturing apparatuses disposed in semiconductor manufacturing equipment for manufacturing semiconductor devices, to supply materials to or perform maintenance on any one of the plurality of semiconductor manufacturing apparatuses in the semiconductor manufacturing equipment, and a loading module provided as a transferable structure including a manipulator for supplying materials to or performing maintenance on any one of the plurality of semiconductor manufacturing apparatuses, and docked to and transferred by the autonomous mobile module, wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked, wherein the autonomous mobile module includes a mobile body provided with a plurality of wheel units to autonomously move between the plurality of semiconductor manufacturing apparatuses in the semiconductor manufacturing equipment, a docking plate provided in a plate shape to provide a flat docking surface on an upper surface thereof, and mounted on an upper surface of the mobile body, and the male coupler rotatably mounted on the docking surface of the docking plate so as to be inserted into the female coupler of the loading module, wherein the male coupler includes a coupler body provided in a shape corresponding to at least a portion of a shape of the female coupler of the loading module, and a rotating cylinder provided in a cylindrical shape overall, rotatably mounted on the docking plate, and provided as the first elastic member including a first coil spring produced by spirally coiling a wire rod with a circular horizontal cross-section, to flexibly support the coupler body, wherein the female coupler includes a coupler holder provided in a cylindrical shape, a docking indentation concavely formed from a lower surface of the coupler holder to have a circular horizontal cross-section, a bump indentation concavely formed sideward or upward from the docking indentation in a certain shape, and a second elastic member including a second coil spring produced by spirally coiling a wire rod with a circular horizontal cross-section in a cylindrical shape overall, in such a manner that the coupler holder is flexibly supported by the loading module, wherein the coupler body includes a docking protrusion provided in a circular plate shape or cylindrical shape having a smaller diameter than the coupler holder so as to be at least partially inserted into the docking indentation, and a bump protruding sideward or upward from the docking protrusion in a shape corresponding to at least a portion of a shape of the bump indentation so as to be at least partially inserted into the bump indentation, wherein a plurality of first contact terminals are radially and equiangularly disposed on a bottom surface of the docking indentation of the female coupler with respect to a center of the docking indentation, and wherein a plurality of second contact terminals are radially and equiangularly disposed on an upper surface of the docking protrusion of the male coupler with respect to a center of the docking protrusion.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
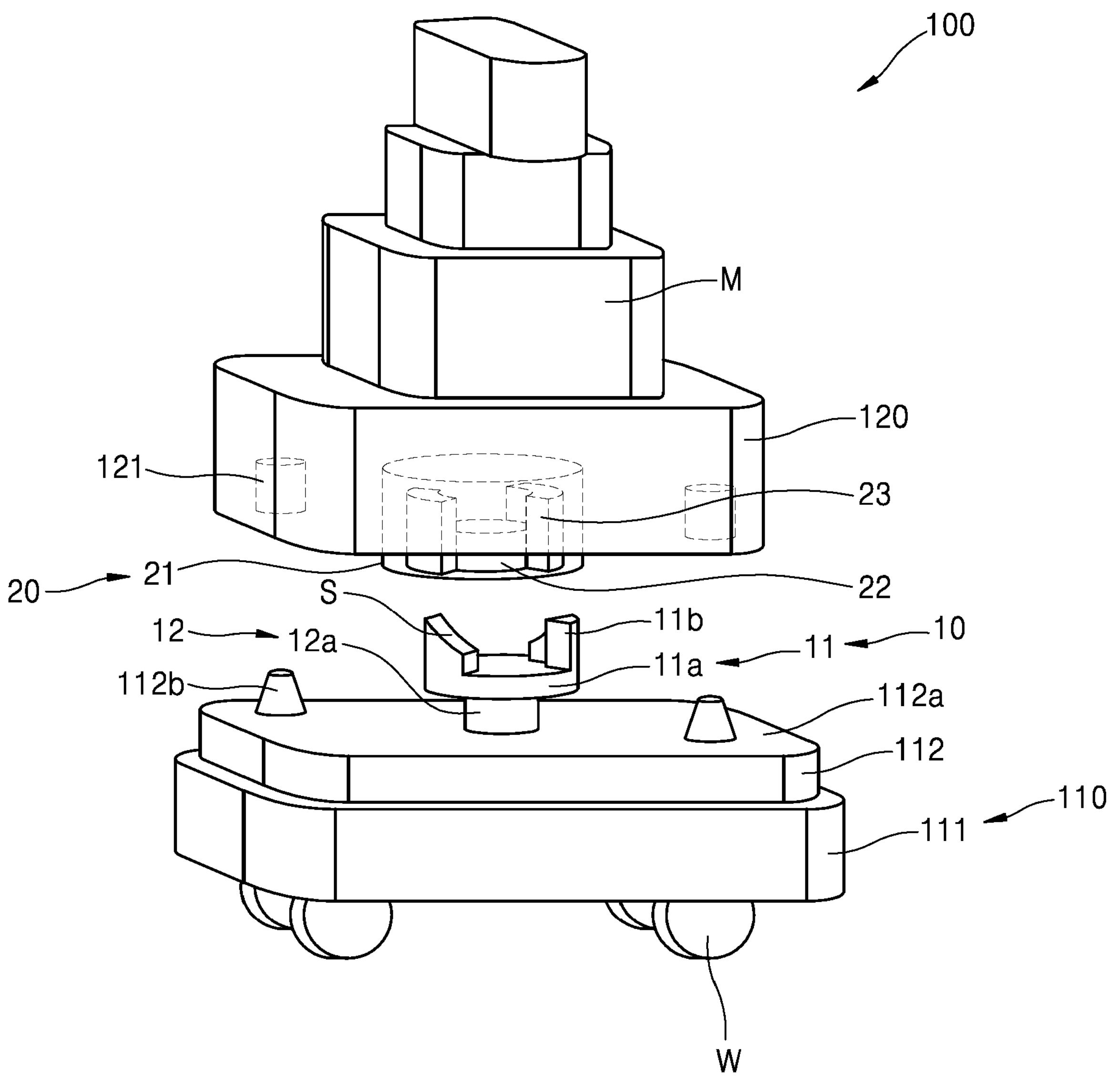
FIG. 1 is a perspective view of an autonomous mobile robot (AMR) according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

Figure 2:
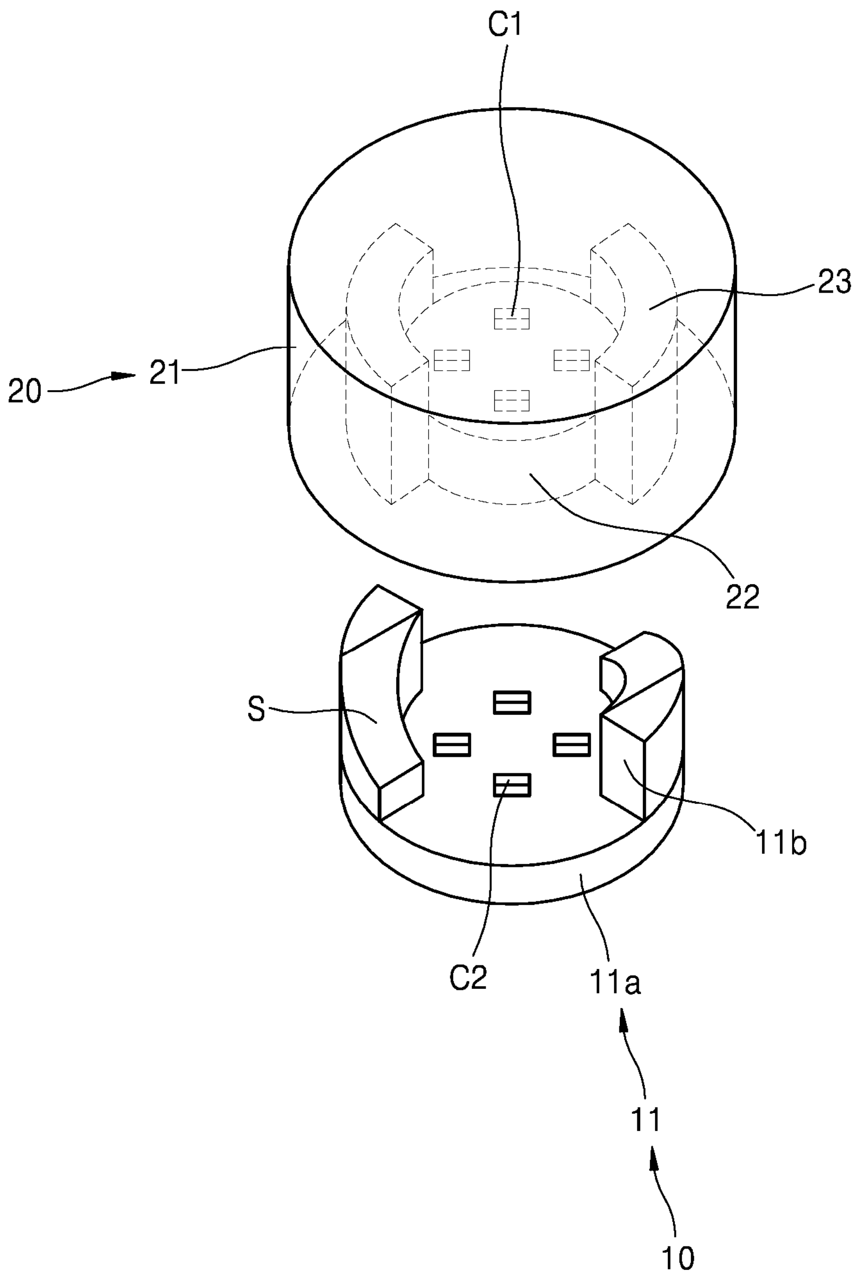
FIGS. 2 and 3 are perspective and cross-sectional views showing an embodiment of a male coupler and a female coupler included in the AMR of FIG. 1.
Figure 3:
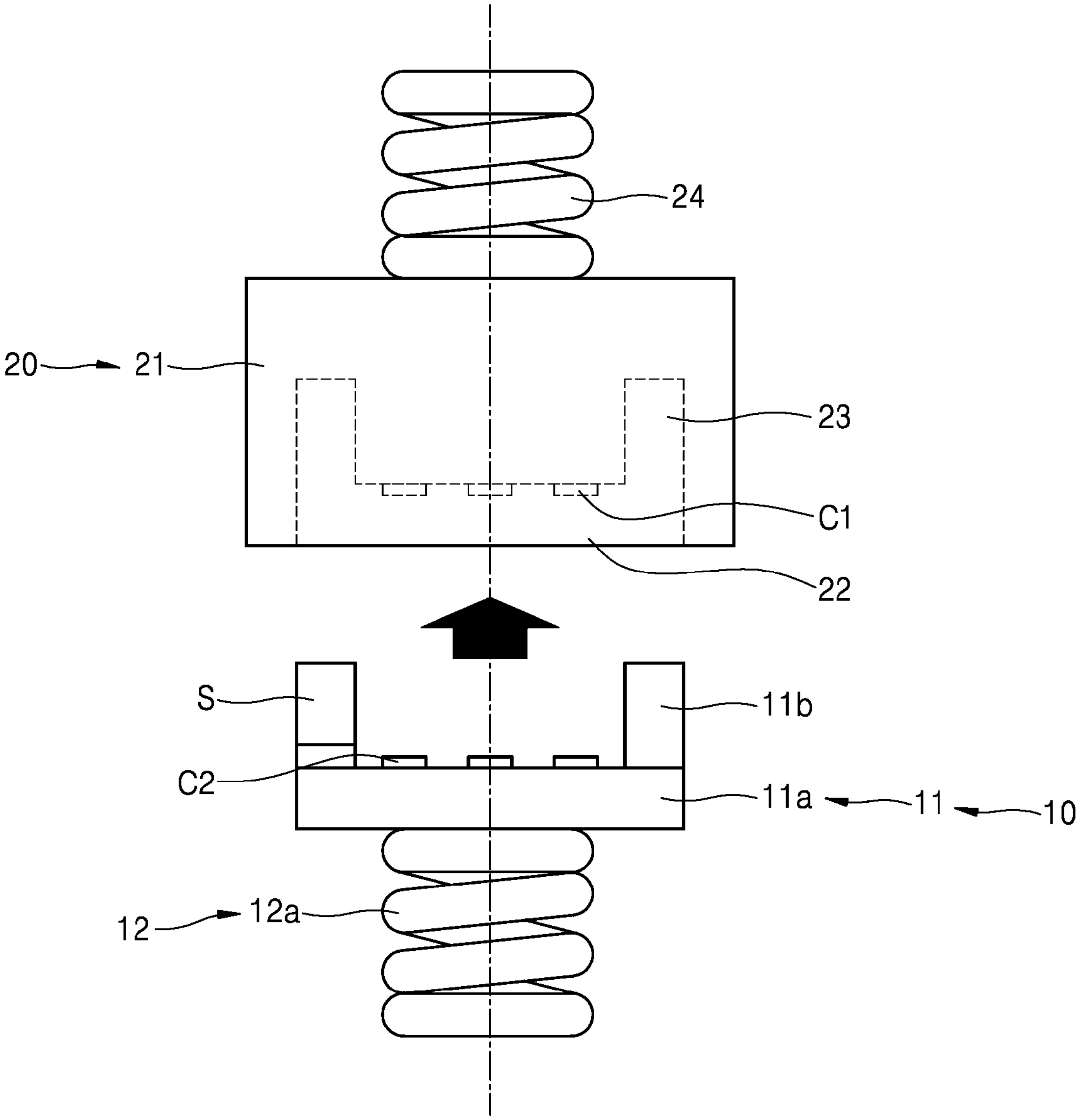
Figure 4:
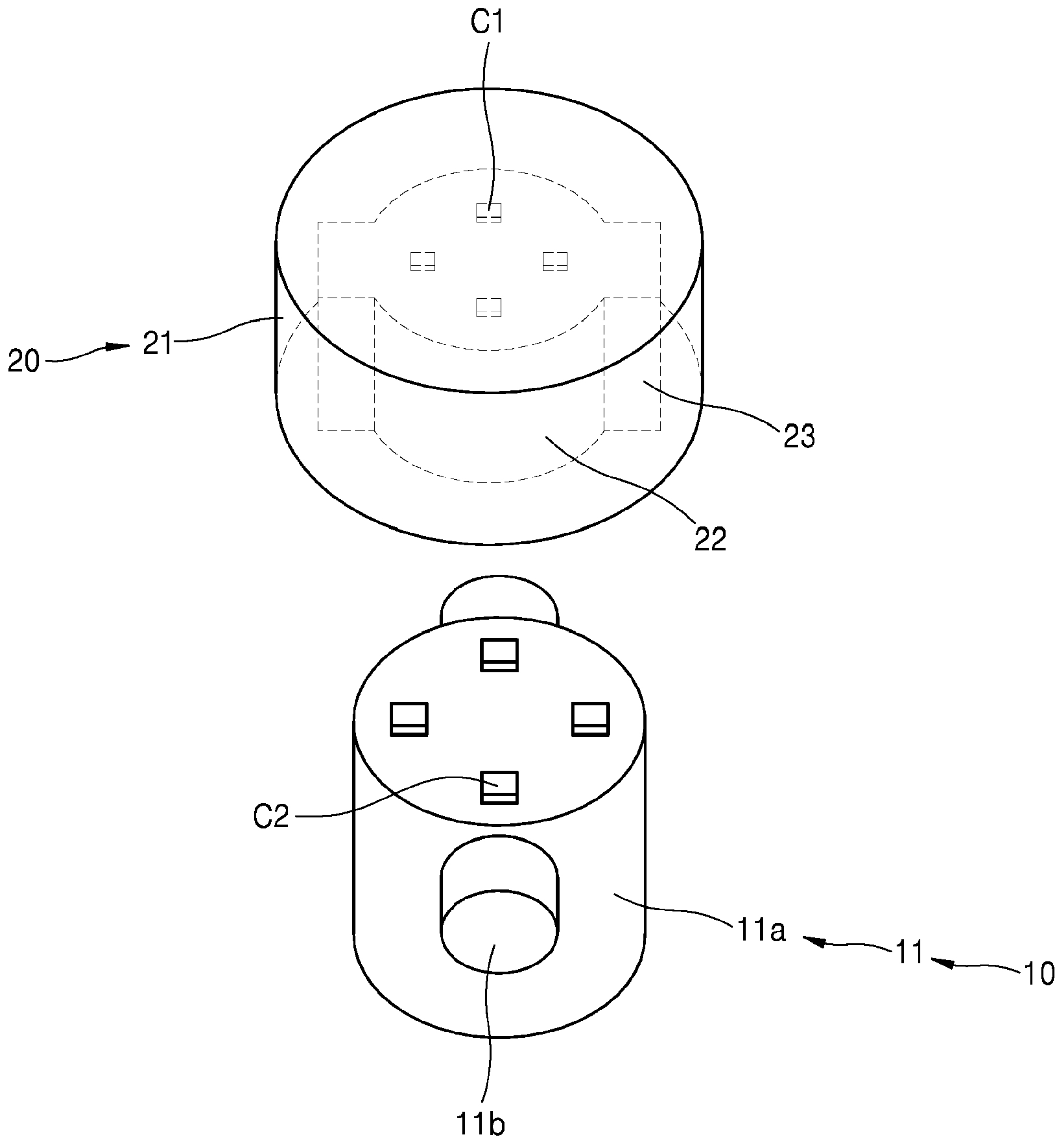
FIGS. 4 and 5 are perspective and cross-sectional views showing another embodiment of the male coupler and the female coupler included in the AMR of FIG. 1.
Figure 5:
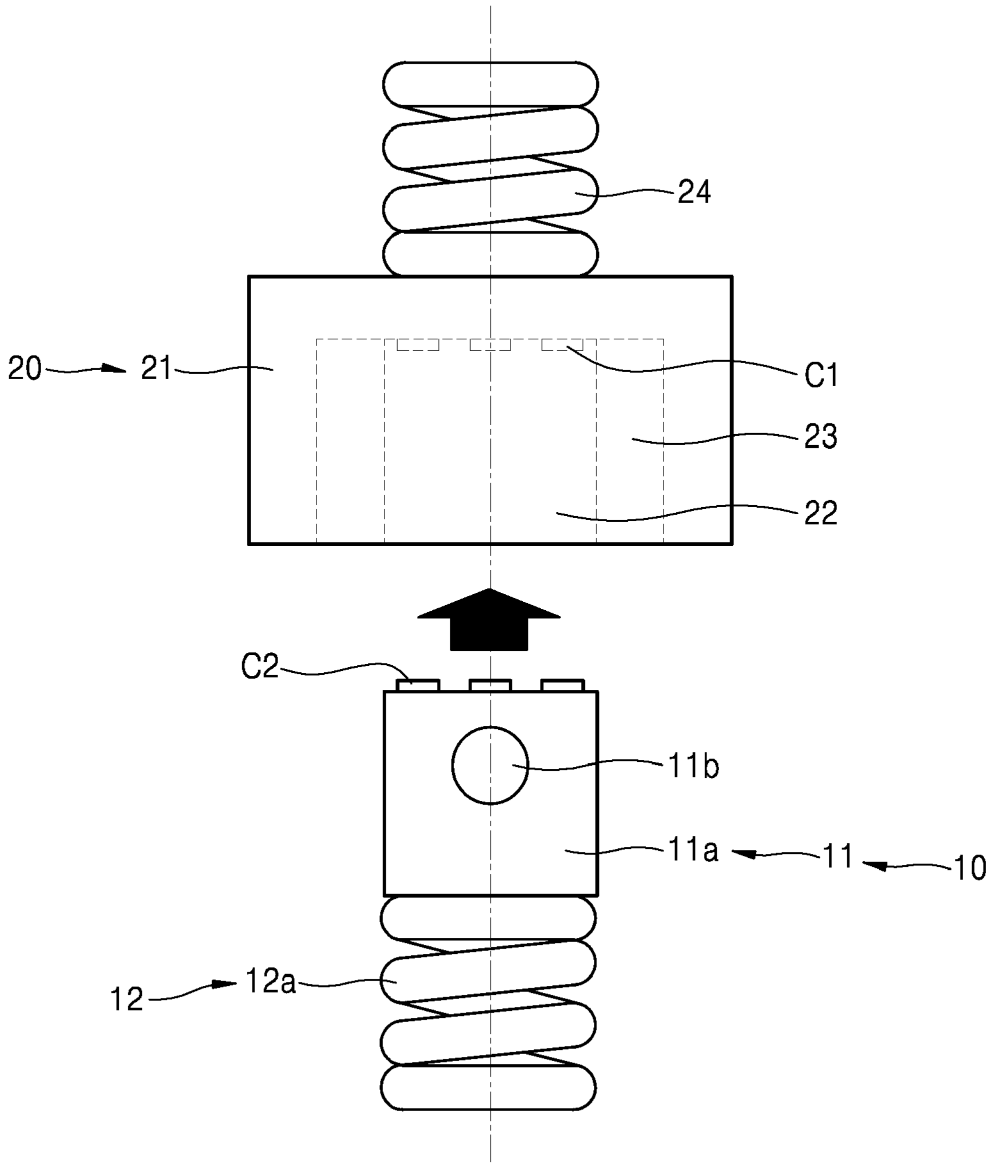

FIG. 1 is a perspective view of an autonomous mobile robot (AMR) 100 according to an embodiment of the present invention, FIGS. 2 and 3 are perspective and cross-sectional views showing an embodiment of a male coupler 10 and a female coupler 20 included in the AMR 100 of FIG. 1, FIGS. 4 and 5 are perspective and cross-sectional views showing another embodiment of the male and female couplers 10 and 20 included in the AMR 100 of FIG. 1, and FIGS. 6 to 12 are cross-sectional views showing a docking process between an autonomous mobile module 110 and a loading module 120 of the AMR 100 of FIG. 1 step by step.

Initially, as shown in FIG. 1, the AMR 100 according to an embodiment of the present invention may mainly include the autonomous mobile module 110 and the loading module 120.

As shown in FIG. 1, the autonomous mobile module 110 may autonomously move along a certain autonomous motion path between a plurality of semiconductor manufacturing apparatuses 200 (see FIG. 13) disposed in semiconductor manufacturing equipment 1000 (see FIG. 13) for manufacturing semiconductor devices, to supply materials to or perform maintenance on any one of the plurality of semiconductor manufacturing apparatuses 200 in the semiconductor manufacturing equipment 1000.

The loading module 120 is a transferable structure including a manipulator M for supplying materials to or performing maintenance on any one of the plurality of semiconductor manufacturing apparatuses 200, and may be docked to and transferred by the autonomous mobile module 110.

Herein, although not specifically shown in the drawings, the manipulator M may be a structure having a function similar to that of a human arm and using a mechanical hand or the like at an end thereof to grab and move materials loaded inside to a semiconductor manufacturing apparatus or to assist work for maintenance of the semiconductor manufacturing apparatus.

In the autonomous mobile module 110 capable of transferring the loading module 120 including the manipulator M, the male coupler 10 rotatably protruding from a docking surface 112*a* of the autonomous mobile module 110 so as to be inserted into the female coupler 20 of the loading module 120 may be flexibly supported by a first elastic member 12*a* so as to be easily inserted into the female coupler 20 despite a stop position error of the autonomous mobile module 110 when the loading module 120 is docked.

Specifically, the autonomous mobile module 110 may be include a mobile body 111 provided in a rectangular plate shape overall and provided with a plurality of wheel units W to autonomously move between the plurality of semiconductor manufacturing apparatuses 200 in the semiconductor manufacturing equipment 1000, a docking plate 112 provided in a rectangular plate shape overall to provide a flat docking surface 112*a* on an upper surface thereof, and mounted on an upper surface of the mobile body 111, and the male coupler 10 rotatably mounted on the docking surface 112*a* of the docking plate 112 so as to be inserted into the female coupler 20 of the loading module 120.

For example, the mobile body 111 of the autonomous mobile module 110 is a kind of mobile structure, and may be provided with four wheel units W mounted thereunder to move on the ground and, although not shown in the drawings, include therein a battery for supplying power for motion, and a communication controller capable of communicating with a motion controller 300 (FIG. 13) of the semiconductor manufacturing equipment 1000 to be described below in a wireless manner to control autonomous motion of the mobile body 111.

The docking plate 112 is a plate on which the loading module 120 to be described below is seated and docked, and may be provided in a rectangular plate shape to provide a flat docking surface 112*a* on an upper surface thereof, and mounted to be lifted to a certain height from the upper surface of the mobile body 111 so as to be docked to the loading module 120 seated on a loading shelf 1 and stored at the certain height.

The docking plate 112 may include at least one guide bump 112*b* protruding from the docking surface 112*a* so as to be inserted into at least one guide indentation 121 formed in a lower surface of the loading module 120 when the loading module 120 is docked, and the guide bump 112*b* may be provided in a conical shape overall so as to be easily inserted into the guide indentation 121 even when an alignment error occurs.

The male coupler 10 included in the autonomous mobile module 110, and the female coupler 20 included in the loading module 120 and coupled to the male coupler when the autonomous mobile module 110 is docked to the loading module 120 will now be described in detail. As shown in FIG. 1, the male coupler 10 may include a coupler body 11 provided in a shape corresponding to at least a portion of the shape of the female coupler 20 of the loading module 120, and a rotating cylinder 12 provided in a cylindrical shape overall and rotatably mounted on the docking plate 112 to position a rotational axis thereof on the same line as a central axis of the docking plate 112 so as to support the coupler body 11.

Specifically, the coupler body 11 may include a docking protrusion 11*a* provided in a circular plate shape or cylindrical shape having a smaller diameter than a coupler holder 21 of the female coupler 20 so as to be at least partially inserted into a docking indentation 22 of the female coupler 20 to be described below, and a bump 11*b* protruding sideward or upward from the docking protrusion 11*a* in a shape corresponding to at least a portion of the shape of a bump indentation 23 so as to be at least partially inserted into the bump indentation 23 of the female coupler 20.

As shown in FIG. 1, the female coupler 20 may include the coupler holder 21 provided in a cylindrical shape, the docking indentation 22 concavely formed from a lower surface of the coupler holder 21 to have a circular horizontal cross-section, and the bump indentation 23 concavely formed sideward or upward from the docking indentation 22 in a certain shape.

The docking indentation 22 and the bump indentation 23 of the female coupler 20, and the docking protrusion 11*a* and the bump 11*b* of the coupler body 11 of the male coupler 10 to be coupled to the docking indentation 22 and the bump indentation 23 may be provided in various shapes.

For example, as shown in FIGS. 2 and 3, the rotating cylinder 12 for supporting the coupler body 11 of the male coupler 10 may be provided as the first elastic member 12*a* to flexibly support the coupler body 11. Specifically, the first elastic member 12*a* may be a first coil spring produced by spirally coiling a wire rod with a circular horizontal cross-section in a cylindrical shape overall.

The coupler holder 21 of the female coupler 20 may also be supported by a second elastic member 24 so as to be flexibly supported by the loading module 120. Specifically, the second elastic member 24 may be a second coil spring produced by spirally coiling a wire rod with a circular horizontal cross-section in a cylindrical shape overall.

In this case, as shown in FIGS. 2 and 3, the bump indentation 23 of the female coupler 20 may be formed in an arc shape along an outer circumferential surface of the docking indentation 22, formed to a deeper depth than the docking indentation 22, and concavely formed upward from the docking indentation 22, and the bump 11*b* of the male coupler 10 may protrude from an upper surface of the circular plate-shaped docking protrusion 11*a* in an arc shape along an outer circumferential surface of the docking protrusion 11*a*, and at least an upper side portion of the bump 11*b* may be provided as a downward slope S inclined downward at a certain angle with respect to the upper surface of the docking protrusion 11*a*.

As such, when the male coupler 10 is rotated by the rotating cylinder 12 and inserted into the female coupler 20 to dock the autonomous mobile module 110 to the loading module 120, the bump 11*b* of the male coupler 10 may be easily inserted into the bump indentation 23 of the female coupler 20 due to the downward slope S provided at the upper side portion of the bump 11*b*. To this end, the downward slope S may be positioned at a front end of the bump 11*b* with respect to a rotation direction of the male coupler 10.

As shown in FIGS. 2 and 3, one or more first contact terminals C1 may be provided on a bottom surface of the docking indentation 22 of the female coupler 20, and one or more second contact terminals C2 to be in contact with the first contact terminals C1 may be provided on the upper surface of the docking protrusion 11*a* of the male coupler 10.

Specifically, a plurality of first contact terminals C1 may be radially and equiangularly disposed on the bottom surface of the docking indentation 22 with respect to the center of the docking indentation 22, and a plurality of second contact terminals C2 may be radially and equiangularly disposed on the upper surface of the docking protrusion 11*a* with respect to the center of the docking protrusion 11*a*. In this case, the plurality of first contact terminals C1 and the plurality of second contact terminals C2 may be disposed on the bottom surface of the docking indentation 22 of the female coupler 20 and the upper surface of the docking protrusion 11*a* of the male coupler 10, respectively, in such a manner that positions of the first and second contact terminals C1 and C2 correspond to each other when the male coupler 10 is inserted into the female coupler 20 by the rotation of the male coupler 10.

As such, when the autonomous mobile module 110 is docked to the loading module 120, the first and second contact terminals C1 and C2 may come into contact with each other by the coupling between the male and female couplers 10 and 20, and thus power supply and communication may be performed between the autonomous mobile module 110 and the loading module 120. For example, the manipulator M included in the loading module 120 may receive power from the battery mounted in the autonomous mobile module 110 or receive a control signal from the communication controller mounted in the autonomous mobile module 110.

In addition, as shown in FIGS. 4 and 5, the bump indentation 23 of the female coupler 20 may be formed to the same depth as the docking indentation 22, and concavely formed sideward from an outer circumferential surface of the docking indentation 22 to have a rectangular horizontal cross-section, and the bump 11*b* of the male coupler 10 may protrude sideward from an outer circumferential surface of the cylinder-shaped docking protrusion 11*a* in a cylindrical shape having a smaller diameter than the docking protrusion 11*a*.

As such, when the male coupler 10 is rotated by the rotating cylinder 12 and inserted into the female coupler 20 to dock the autonomous mobile module 110 to the loading module 120, the bump 11*b* of the male coupler 10 may be easily inserted into the bump indentation 23 of the female coupler 20 due to the circular outer circumferential surface of the bump 11*b*.

A docking process between the autonomous mobile module 110 and the loading module 120 of the above-described AMR 100 will now be described in detail.

Figure 6:
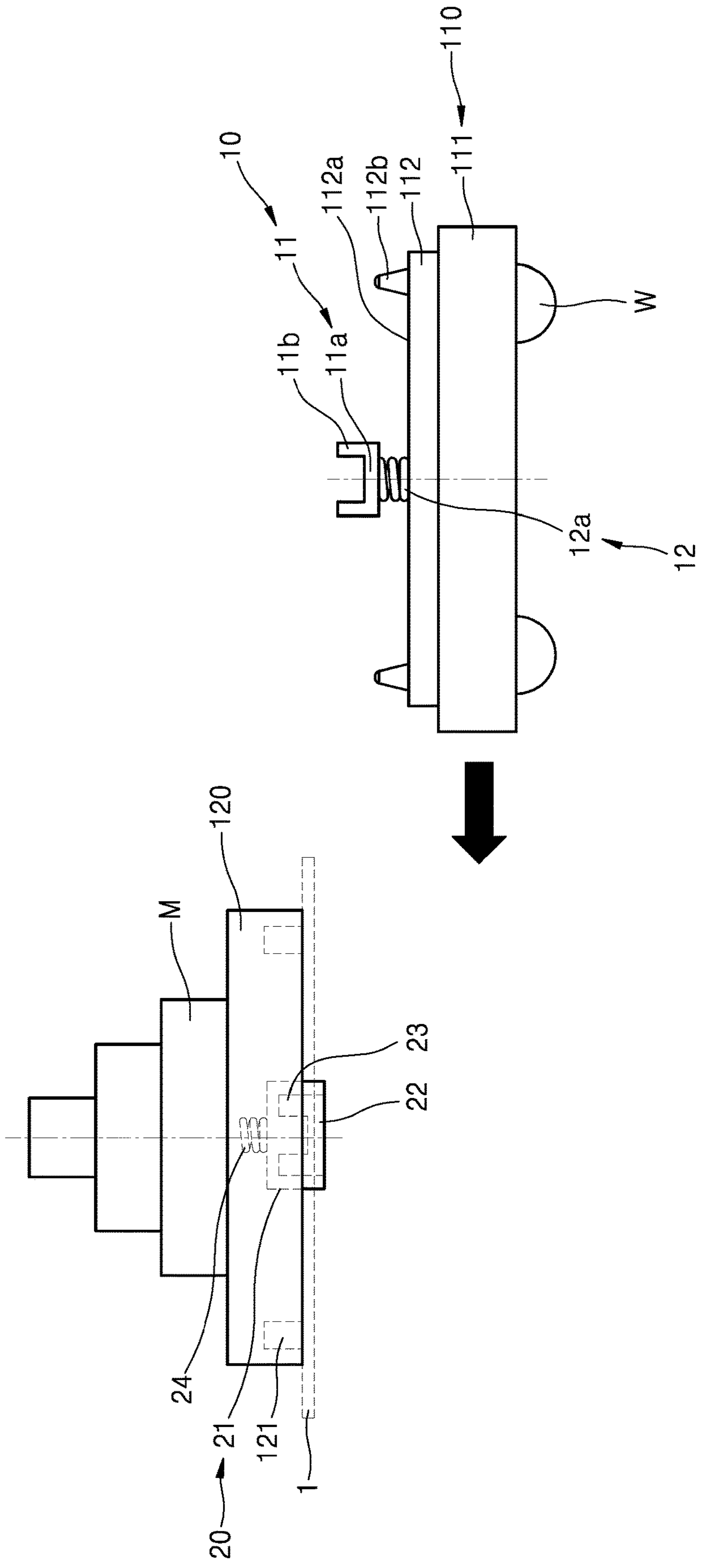
FIGS. 6 to 12 are cross-sectional views showing a docking process between an autonomous mobile module and a loading module of the AMR of FIG. 1 step by step.
Figure 7:
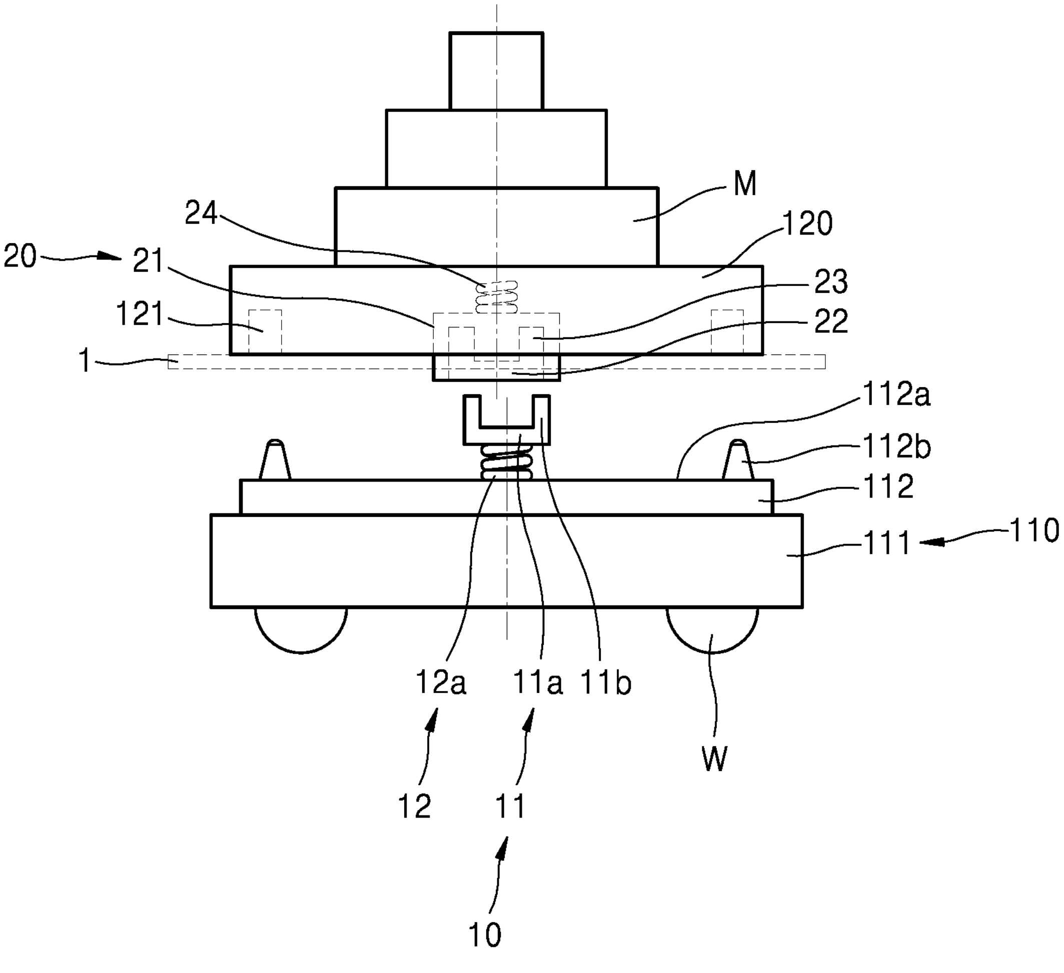

Initially, as shown in FIGS. 6 and 7, the autonomous mobile module 110 may go under the shelf 1 on which the loading module 120 seated and stored.

Figure 8:
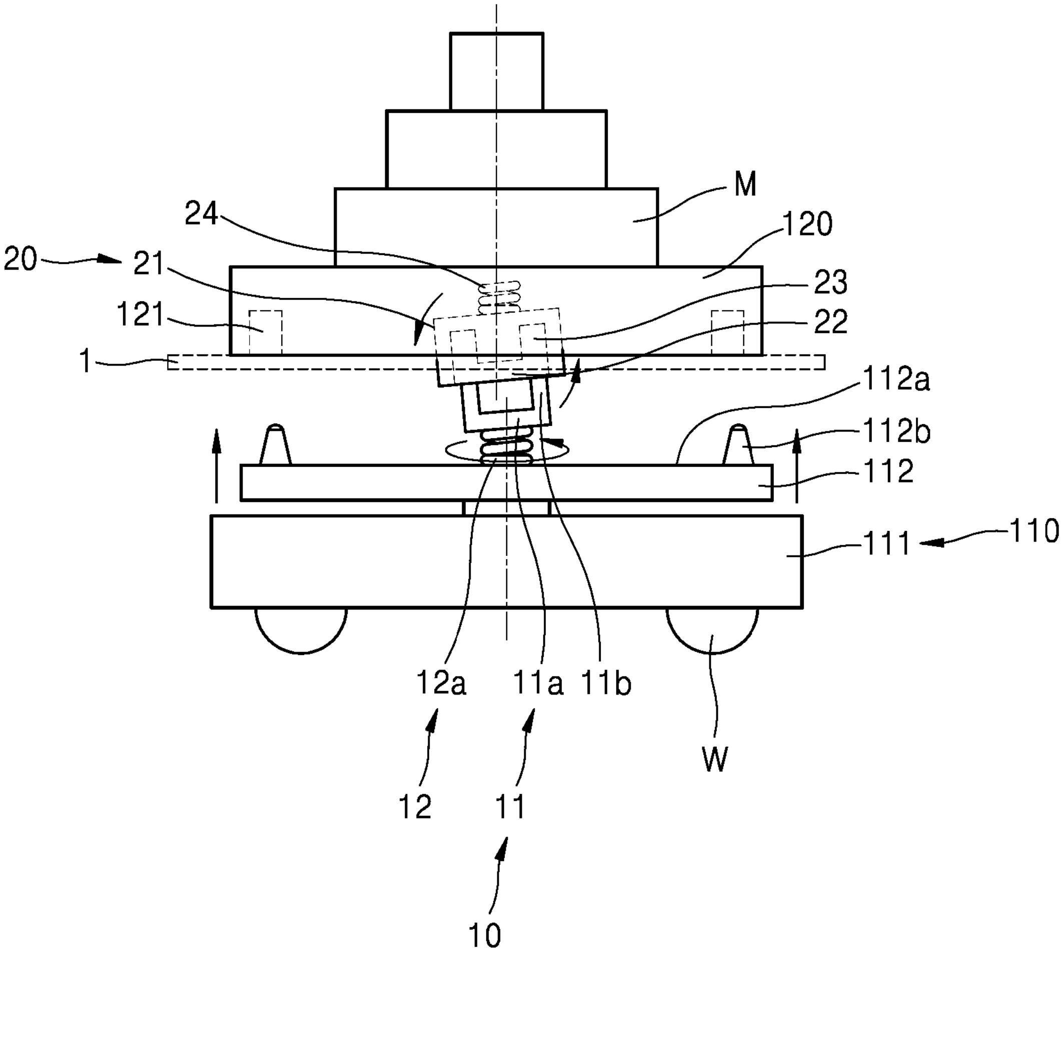

Then, as shown in FIG. 8, to be docked to the loading module 120, the docking plate 112 of the autonomous mobile module 110 may start to be lifted.

In this case, even when the male coupler 10 of the autonomous mobile module 110 is slightly misaligned with the female coupler 20 of the loading module 120 due to a stop position error of the autonomous mobile module 110, as shown in FIG. 8, because the male coupler 10 is flexibly supported by the rotating cylinder 12 including the first elastic member 12*a* and the female coupler 20 is flexibly supported by the second elastic member 24, the male and female couplers 10 and 20 may be rotated to their coupling positions and easily coupled to each other.

Figure 9:
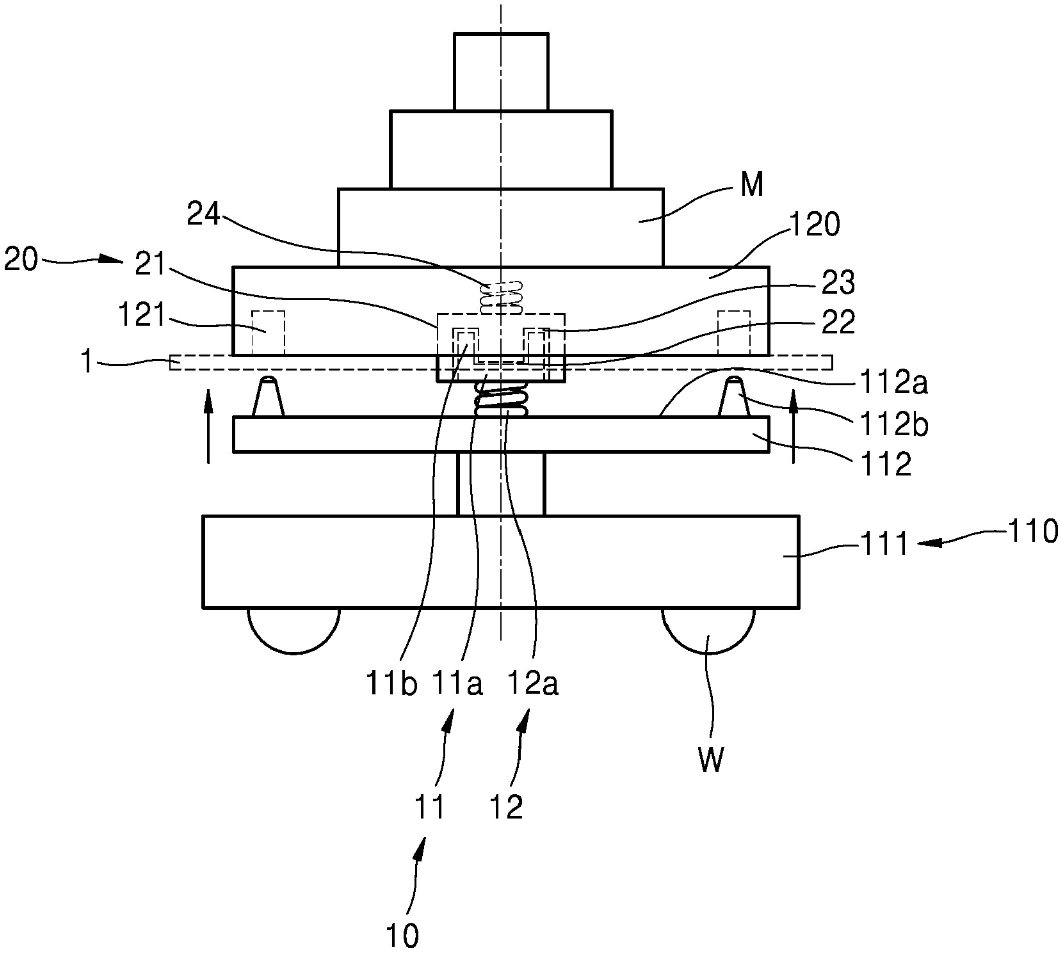
Figure 10:
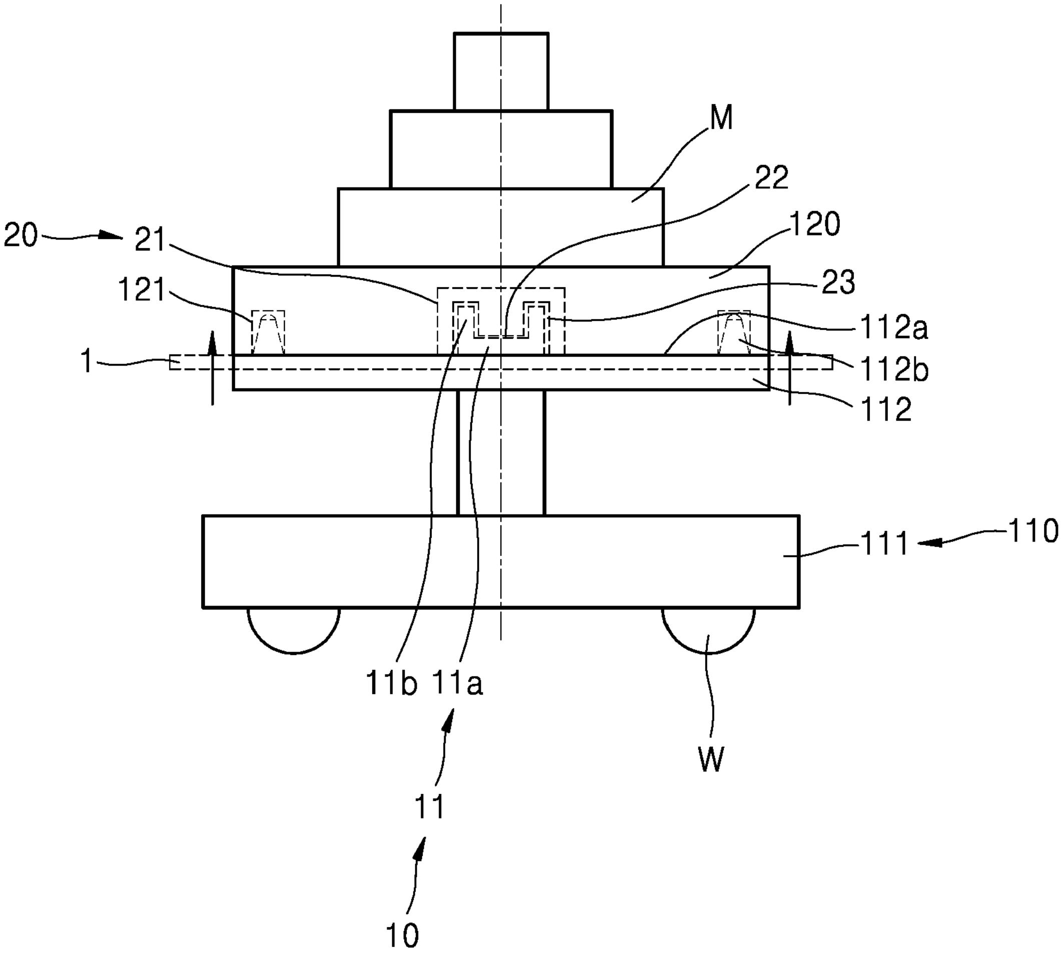

Then, as shown in FIGS. 9 and 10, the autonomous mobile module 110 may be aligned with the loading module 120 while the docking plate 112 of the autonomous mobile module 110 continues to be lifted to fully couple the male coupler 10 to the female coupler 20 and, ultimately, the cone-shaped guide bump 112*b* provided on the docking plate 112 may be inserted into the guide indentation 121 to guide a docking position, thereby appropriately docking the autonomous mobile module 110 to the loading module 120 in place.

Figure 11:
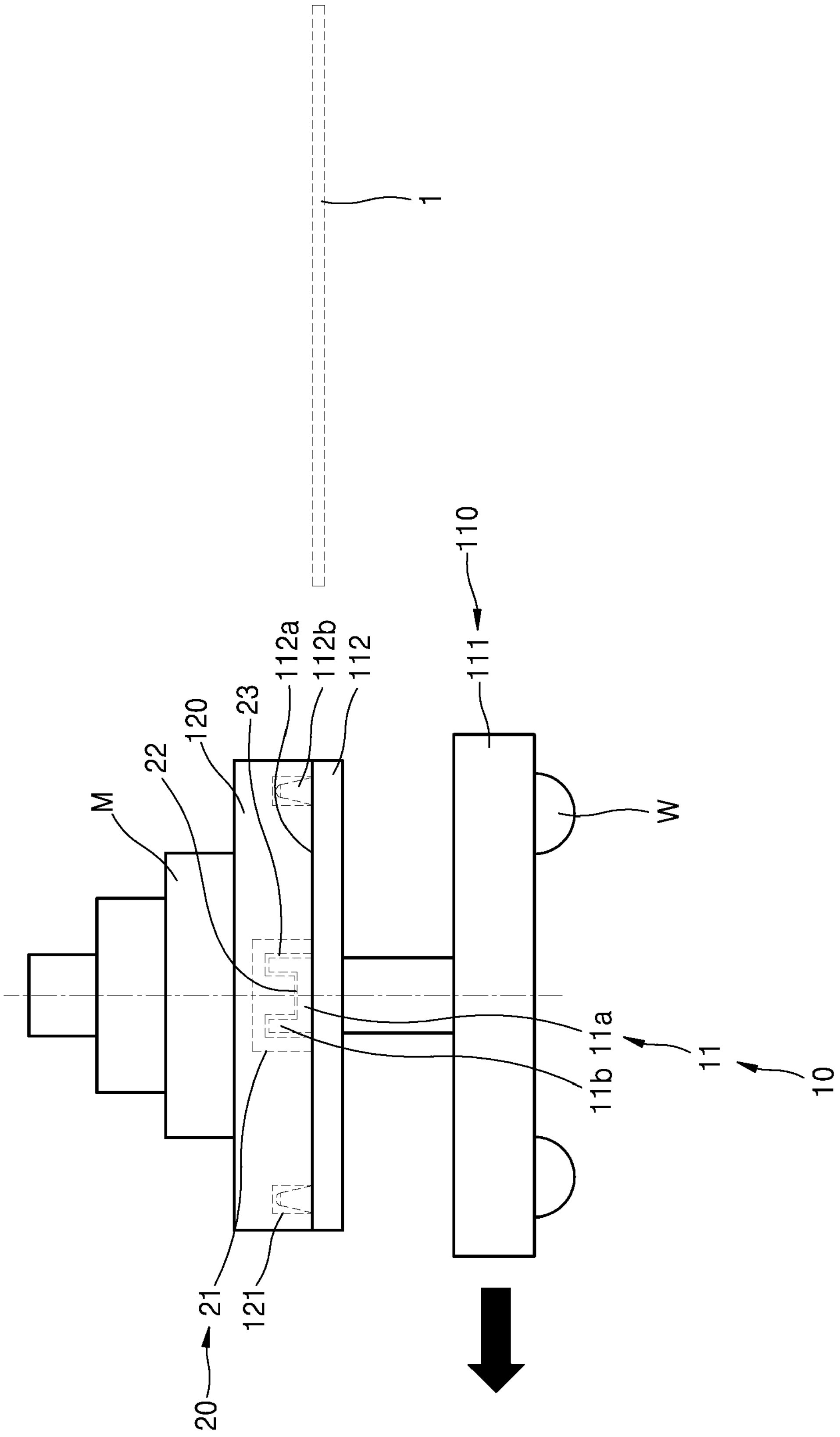
Figure 12:
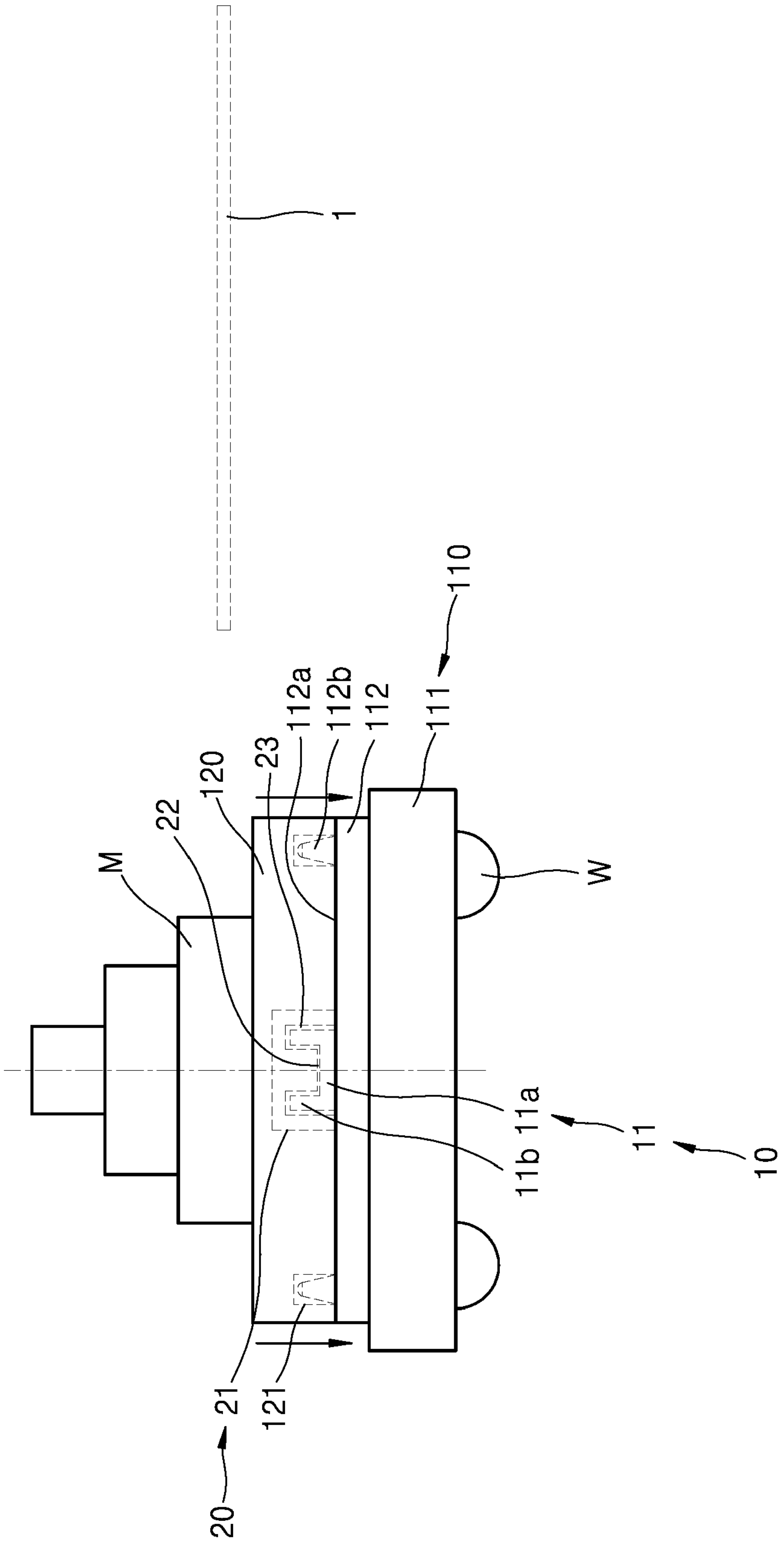

As described above, after the autonomous mobile module 110 is docked to the loading module 120, as shown in FIG. 11, the autonomous mobile module 110 may move out of the shelf 1 to separate the docked loading module 120 from the shelf 1. Then, as shown in FIG. 12, the docking plate 112 may be lowered to its original position and thus the docking process between the autonomous mobile module 110 and the loading module 120 may be completed.

An embodiment of the semiconductor manufacturing equipment 1000 including the above-described AMR 100 will now be described in detail.

Figure 13:
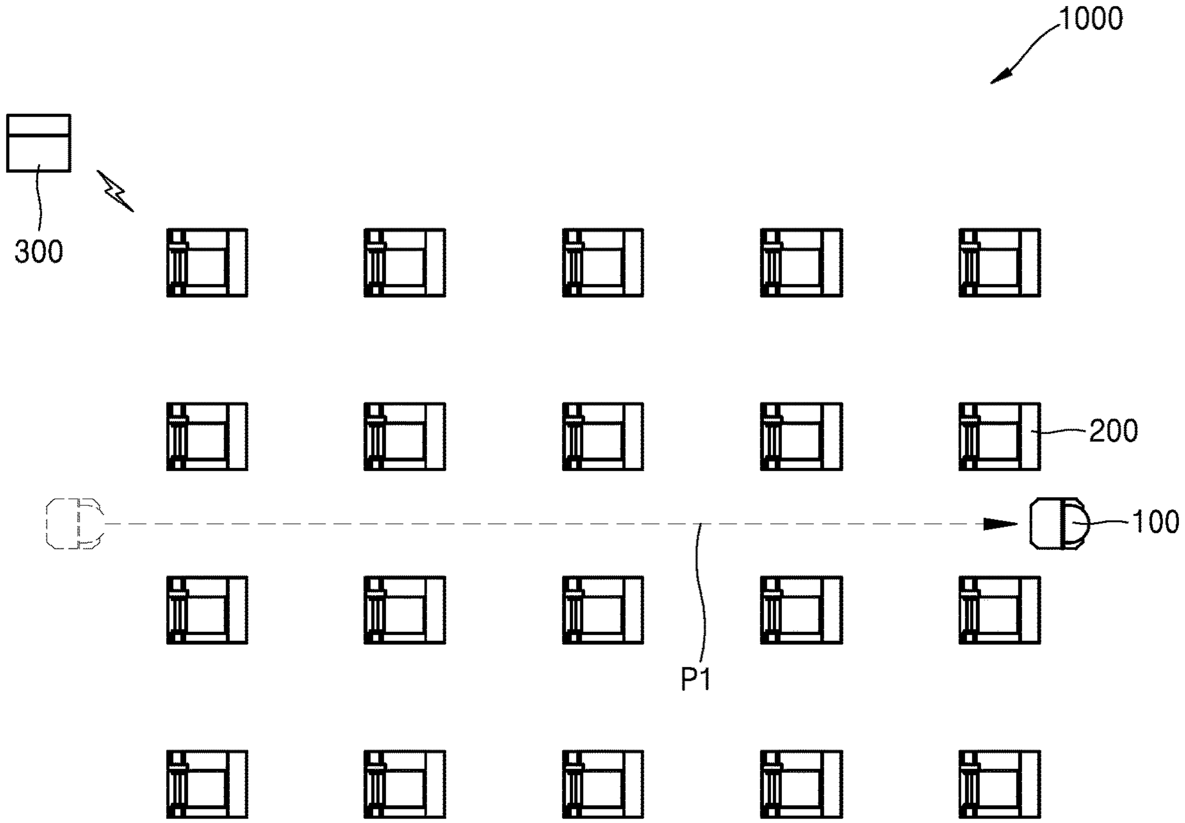
FIGS. 13 and 14 are cross-sectional views of semiconductor manufacturing equipment to which the AMR of FIG. 1 is applied.
Figure 14:
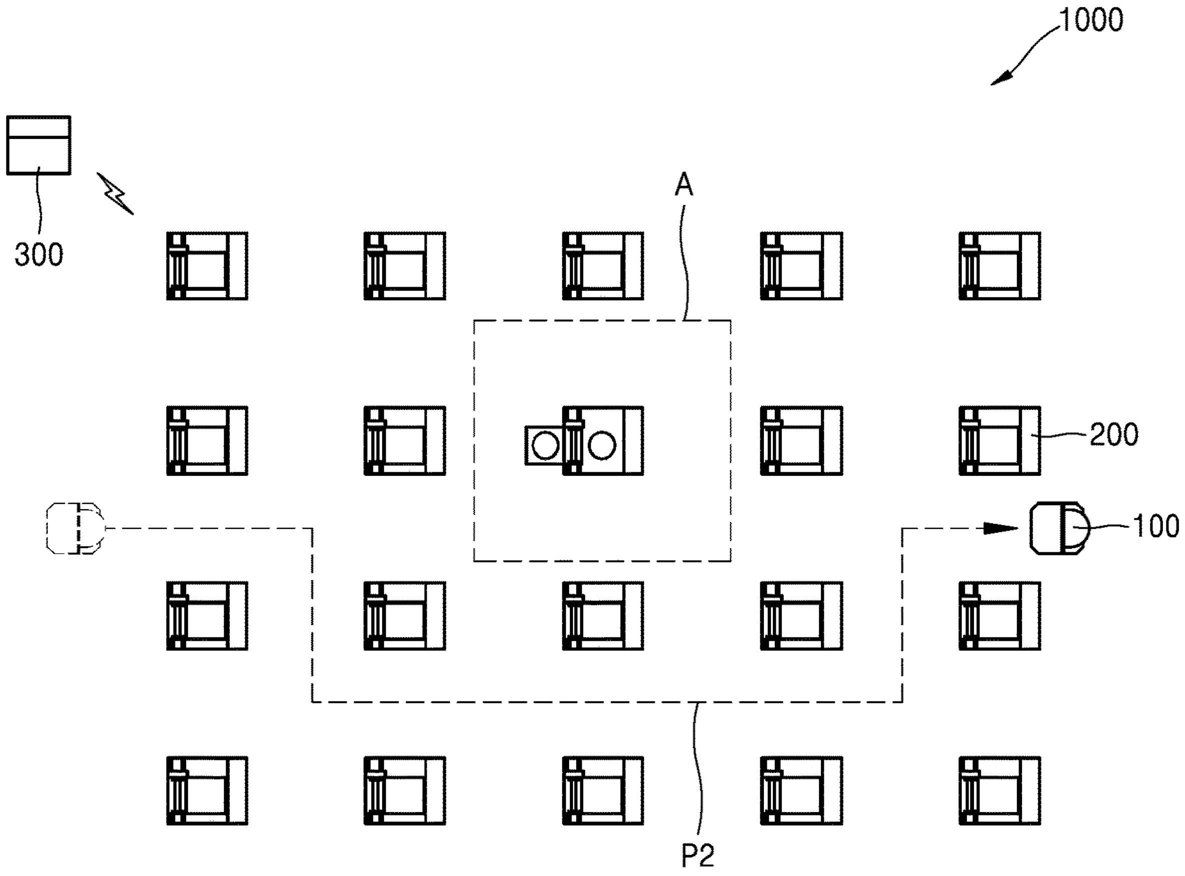

FIGS. 13 and 14 are cross-sectional views of the semiconductor manufacturing equipment 1000 to which the AMR 100 of FIG. 1 is applied.

As shown in FIG. 13, the semiconductor manufacturing equipment 1000 may be disposed in a clean room where a semiconductor manufacturing process is performed, and used to manufacture semiconductor devices. For example, the semiconductor manufacturing equipment 1000 may include the plurality of semiconductor manufacturing apparatuses 200 disposed in the clean room to manufacture the semiconductor devices, the AMR 100 capable of autonomously moving along a certain autonomous motion path P1 between the plurality of semiconductor manufacturing apparatuses 200 to supply materials to or perform maintenance on any one of the plurality of semiconductor manufacturing apparatuses 200, and the motion controller 300 capable of applying a control signal to the AMR 100 in a wireless manner to control motion of the AMR 100.

Herein, a semiconductor manufacturing apparatus on which maintenance work is performed may transmit, to the motion controller 300, a first signal indicating that the maintenance work has started and a second signal indicating that the maintenance work has ended. As such, as shown in FIG. 14, when the first signal is received from any one of the plurality of semiconductor manufacturing apparatuses 200, the motion controller 300 may change the autonomous motion path P1 of the AMR 100 to another autonomous motion path P2 so as not to overlap with a preset area A around the semiconductor manufacturing apparatus on which the maintenance work is performed.

Therefore, based on the AMR 100 and the semiconductor manufacturing equipment 1000 including the same, according to various embodiments of the present invention, by applying a common standard to the female coupler 20 and the male coupler 10, which are connected for power supply and communication when the autonomous mobile module 110 is docked to the loading module 120, one autonomous mobile module 110 may be compatible with a plurality of loading modules 120. As such, because the loading module 120 docked to the autonomous mobile module 110 may be replaced with another depending on a purpose of use, a plurality of loading modules 120 may be used by one autonomous mobile module 110 and thus cost saving and space utilization may be maximized in a semiconductor manufacturing process.

In addition, the male and female couplers 10 and 20 may be flexibly bent and coupled in axial alignment despite a stop position error of the autonomous mobile module 110 when the loading module 120 is docked, because the autonomous mobile module 110 and the loading module 120 include the male and female couplers 10 and flexibly supported by elastic members, the possibility of docking failure between the autonomous mobile module 110 and the loading module 120 may be minimized by ultimately coupling the guide indentation 121 formed in the loading module 120 to the guide bump 112*b* provided on the autonomous mobile module 110 to guide a docking position, and the efficiency of battery use of the autonomous mobile module 110 may be increased by supplying power to the loading module 120 through the couplers 10 and 20 only when docked.

According to the afore-described embodiments of the present invention, by applying a common standard to a female coupler and a male coupler, which are connected for power supply and communication when an autonomous mobile module is docked to a loading module, one autonomous mobile module may be compatible with a plurality of loading modules. As such, because the loading module docked to the autonomous mobile module may be replaced with another depending on a purpose of use, a plurality of loading modules may be used by one autonomous mobile module and thus cost saving and space utilization may be maximized in a semiconductor manufacturing process.

In addition, an AMR capable of allowing male and female couplers to be flexibly bent and coupled in axial alignment despite a stop position error of an autonomous mobile module when a loading module is docked, because the autonomous mobile module and the loading module include the male and female couplers flexibly supported by elastic members, of minimizing the possibility of docking failure between the autonomous mobile module and the loading module by ultimately coupling a guide indentation formed in the loading module to a guide bump provided on the autonomous mobile module to guide a docking position, and of increasing the efficiency of battery use of the autonomous mobile module by supplying power to the loading module through the couplers only when docked, and semiconductor manufacturing equipment including the AMR may be implemented. However, the scope of the present invention is not limited the above effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. An autonomous mobile robot (AMR) comprising:

an autonomous mobile module capable of autonomously moving along a certain autonomous motion path between a plurality of semiconductor manufacturing apparatuses disposed in semiconductor manufacturing equipment for manufacturing semiconductor devices, to supply materials to or perform maintenance on any one of the plurality of semiconductor manufacturing apparatuses in the semiconductor manufacturing equipment; and a loading module provided as a transferable structure comprising a manipulator for supplying materials to or performing maintenance on any one of the plurality of semiconductor manufacturing apparatuses, and docked to and transferred by the autonomous mobile module, wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked, and wherein the male coupler includes a coupler body having a bottom surface connected to the first elastic member.

2. The AMR of claim 1, wherein the autonomous mobile module comprises:

a mobile body provided with a plurality of wheel units to autonomously move between the plurality of semiconductor manufacturing apparatuses in the semiconductor manufacturing equipment;

a docking plate provided in a plate shape to provide a flat docking surface on an upper surface of the docking plate, and mounted on an upper surface of the mobile body; and the male coupler rotatably mounted on the docking surface of the docking plate so as to be inserted into the female coupler of the loading module.

3. The AMR of claim 2, wherein the male coupler further comprises:

a rotating cylinder provided in a cylindrical shape overall and rotatably mounted on the docking plate to support the coupler body, wherein the coupler body is provided in a shape corresponding to at least a portion of a shape of the female coupler of the loading module.

4. The AMR of claim 3, wherein the rotating cylinder is provided as the first elastic member to flexibly support the coupler body.

5. The AMR of claim 4, wherein the first elastic member comprises a first coil spring produced by spirally coiling a wire rod with a circular horizontal cross-section in a cylindrical shape overall.

6. The AMR of claim 3, wherein the rotating cylinder is mounted on the docking plate to position a rotational axis thereof on the same line as a central axis of the docking plate.

7. The AMR of claim 3, wherein the female coupler comprises:

a coupler holder provided in a cylindrical shape;

a docking indentation concavely formed from a lower surface of the coupler holder to have a circular horizontal cross-section; and a bump indentation concavely formed sideward or upward from the docking indentation in a certain shape.

8. The AMR of claim 7, wherein the coupler body comprises:

a docking protrusion provided in a circular plate shape or cylindrical shape having a smaller diameter than the coupler holder so as to be at least partially inserted into the docking indentation; and a bump protruding sideward or upward from the docking protrusion in a shape corresponding to at least a portion of a shape of the bump indentation so as to be at least partially inserted into the bump indentation.

9. The AMR of claim 8, wherein the bump indentation of the female coupler is formed to the same depth as the docking indentation, and concavely formed sideward from an outer circumferential surface of the docking indentation to have a rectangular horizontal cross-section, and wherein the bump of the male coupler protrudes sideward from an outer circumferential surface of the cylinder-shaped docking protrusion in a cylindrical shape having a smaller diameter than the docking protrusion.

10. The AMR of claim 8, wherein the bump indentation of the female coupler is formed in an arc shape along an outer circumferential surface of the docking indentation, formed to a deeper depth than the docking indentation, and concavely formed upward from the docking indentation, and wherein the bump of the male coupler protrudes from an upper surface of the circular plate-shaped docking protrusion in an arc shape along an outer circumferential surface of the docking protrusion.

11. The AMR of claim 10, wherein at least an upper side portion of the bump is provided as a slope inclined downward at a certain angle with respect to the upper surface of the docking protrusion.

12. The AMR of claim 8, wherein one or more first contact terminals are provided on a bottom surface of the docking indentation of the female coupler, and wherein one or more second contact terminals to be in contact with the first contact terminals are provided on an upper surface of the docking protrusion of the male coupler.

13. The AMR of claim 12, wherein a plurality of first contact terminals are radially and equiangularly disposed on the bottom surface of the docking indentation with respect to a center of the docking indentation, and wherein a plurality of second contact terminals are radially and equiangularly disposed on the upper surface of the docking protrusion with respect to a center of the docking protrusion.

14. The AMR of claim 7, wherein the female coupler is supported by a second elastic member so as to be flexibly supported by the loading module.

15. The AMR of claim 14, wherein the second elastic member comprises a second coil spring produced by spirally coiling a wire rod with a circular horizontal cross-section in a cylindrical shape overall.

16. The AMR of claim 2, wherein the docking plate is mounted on the upper surface of the mobile body so as to be lifted to a certain height.

17. The AMR of claim 2, wherein the docking plate comprises at least one guide bump protruding from the docking surface so as to be inserted into at least one guide indentation formed in a lower surface of the loading module when the loading module is docked.

18. Semiconductor manufacturing equipment comprising:

a plurality of semiconductor manufacturing apparatuses for manufacturing semiconductor devices;

an autonomous mobile robot (AMR) capable of autonomously moving along an autonomous motion path between the plurality of semiconductor manufacturing apparatuses to supply materials to or perform maintenance on any one of the plurality of semiconductor manufacturing apparatuses; and a motion controller capable of applying a control signal to the AMR in a wireless manner to control motion of the AMR, wherein the AMR comprises:

an autonomous mobile module capable of autonomously moving along a certain path between the plurality of semiconductor manufacturing apparatuses; and a loading module provided as a transferable structure comprising a manipulator for supplying materials to or performing maintenance on any one of the plurality of semiconductor manufacturing apparatuses, and docked to and transferred by the autonomous mobile module, and wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked, and wherein the male coupler includes a coupler body having a bottom surface connected to the first elastic member.

19. The semiconductor manufacturing equipment of claim 18, wherein a semiconductor manufacturing apparatus on which maintenance work is performed transmits, to the motion controller, a first signal indicating that the maintenance work has started and a second signal indicating that the maintenance work has ended, and wherein, when the first signal is received, the motion controller changes the autonomous motion path of the AMR so as not to overlap with a preset area around the semiconductor manufacturing apparatus on which the maintenance work is performed.

20. An autonomous mobile robot (AMR) comprising:

an autonomous mobile module capable of autonomously moving along a certain path between a plurality of semiconductor manufacturing apparatuses disposed in semiconductor manufacturing equipment for manufacturing semiconductor devices, to supply materials to or perform maintenance on any one of the plurality of semiconductor manufacturing apparatuses in the semiconductor manufacturing equipment; and a loading module provided as a transferable structure comprising a manipulator for supplying materials to or performing maintenance on any one of the plurality of semiconductor manufacturing apparatuses, and docked to and transferred by the autonomous mobile module, wherein, in the autonomous mobile module, a male coupler rotatably protruding from a docking surface of the autonomous mobile module so as to be inserted into a female coupler of the loading module is flexibly supported by a first elastic member so as to be easily inserted into the female coupler despite a stop position error of the autonomous mobile module when the loading module is docked, wherein the autonomous mobile module comprises:

a mobile body provided with a plurality of wheel units to autonomously move between the plurality of semiconductor manufacturing apparatuses in the semiconductor manufacturing equipment;

a docking plate provided in a plate shape to provide a flat docking surface on an upper surface of the docking plate, and mounted on an upper surface of the mobile body; and the male coupler rotatably mounted on the docking surface of the docking plate so as to be inserted into the female coupler of the loading module, wherein the male coupler comprises:

a coupler body provided in a shape corresponding to at least a portion of a shape of the female coupler of the loading module; and a rotating cylinder provided in a cylindrical shape overall, rotatably mounted on the docking plate, and provided as the first elastic member comprising a first coil spring produced by spirally coiling a wire rod with a circular horizontal cross-section, to flexibly support the coupler body, wherein the female coupler comprises:

a coupler holder provided in a cylindrical shape;

a docking indentation concavely formed from a lower surface of the coupler holder to have a circular horizontal cross-section;

a bump indentation concavely formed sideward or upward from the docking indentation in a certain shape; and a second elastic member comprising a second coil spring produced by spirally coiling a wire rod with a circular horizontal cross-section in a cylindrical shape overall, in such a manner that the coupler holder is flexibly supported by the loading module, wherein the coupler body comprises:

a docking protrusion provided in a circular plate shape or cylindrical shape having a smaller diameter than the coupler holder so as to be at least partially inserted into the docking indentation; and a bump protruding sideward or upward from the docking protrusion in a shape corresponding to at least a portion of a shape of the bump indentation so as to be at least partially inserted into the bump indentation, wherein a plurality of first contact terminals are radially and equiangularly disposed on a bottom surface of the docking indentation of the female coupler with respect to a center of the docking indentation, and wherein a plurality of second contact terminals are radially and equiangularly disposed on an upper surface of the docking protrusion of the male coupler with respect to a center of the docking protrusion.

* * * * *